(12) United States Patent
Braiman

(10) Patent No.: US 7,855,679 B1
(45) Date of Patent: Dec. 21, 2010

(54) GPS SYSTEM FOR TRACKING AN OBJECT OF INTEREST AND METHOD FOR USING THE SAME

(75) Inventor: Michael Braiman, Netanya (IL)

(73) Assignee: P. W. Precyse Wireless Ltd (IL)

(*) Notice: Subject to any disclaimer, the term of this patent is extended or adjusted under 35 U.S.C. 154(b) by 174 days.

(21) Appl. No.: 12/045,344

(22) Filed: Mar. 10, 2008

(51) Int. Cl.
*G01S 19/05* (2010.01)

(52) U.S. Cl. .................................. 342/357.42

(58) Field of Classification Search ............ 342/357.07, 342/357.42
See application file for complete search history.

(56) References Cited

U.S. PATENT DOCUMENTS 6,700,533 B1  3/2004  Werb et al.
7,633,438 B2 * 12/2009  Tysowski ............... 342/357.09
2008/0027599 A1 * 1/2008  Logan et al. ................. 701/23

\* cited by examiner

*Primary Examiner*—Thomas H Tarcza
*Assistant Examiner*—Harry Liu
(74) *Attorney, Agent, or Firm*—Duane Morris LLP

(57) ABSTRACT

An assisted global positioning system (AGPS) for tracking a movable object of interest is disclosed. The system comprises a service center for calculating a tag location, a plurality of ground base stations, a plurality of beacons adapted to transmit individual ID data, and at least one GPS-based smart tag releasably affixed to the movable object. The system components are interconnected by means of one or more communication links. The service center is adapted for inquiring the tag and receiving a response from the tag constituting pseudo-ranges according to a predetermined protocol.

18 Claims, 5 Drawing Sheets

GPS SYSTEM FOR TRACKING AN OBJECT OF INTEREST AND METHOD FOR USING THE SAME

FIELD OF THE INVENTION

The present invention generally relates to an object tracking system and, more specifically, to a tracking system generating a GPS assisted data provided to an inquirable GPS smart tag attached to an object of interest.

BACKGROUND OF THE INVENTION

Global positioning systems (GPS) have become one of the most common tools used to determine an object's location accurately anywhere on the globe. Thus GPS has become a commonly used tool for navigation and for tracking fleets of vehicles, trucks, ships and airplanes. A GPS receiver calculates its position by measuring the distance between itself and three or more GPS satellites. The satellites are equipped with extremely accurate atomic clocks, and the receiver uses an internal crystal oscillator-based clock that is continually updated by using signals from the satellites. When distance to four satellites is measured simultaneously, the intersection of the four imaginary spheres determines the location of the receiver. Earth-based users can substitute the sphere of the planet for one satellite by using their altitude data. Typical measured position accuracy of GPS receivers is several meters. GPS receiver position measurement also has some limiting factors. The GPS receiver requires line-of-sight with at least four satellites. When the receiver is indoors or in an urban area, the signals received by a GPS receiver from the satellites are weak. Furthermore, some of the satellite data stream is broadcast at a very slow rate of 50 bits per second, thus taking several minutes for a conventional GPS receiver to download the required data from the satellites before computing its own location.

U.S. Pat. No. 6,700,533, which is incorporated herein by reference, discloses a system for tracking objects outdoors. Tags attached to objects such as trailers include GPS receivers. Tags transmit uncorrected position and satellite data to a base station, where differential corrections are applied, providing 2-5 meter accuracy of the position of the tag and object. Tags are on a low duty cycle. When a tag powers on, it receives accurate time and current satellite data from the base station, enabling the tags to acquire the satellite signal quickly and with minimum power consumption. When a tag is out of base station range, the tag periodically calculates and archives its position. The tag may also include Real Time Locating Systems technology, to enable tracking to continue when the tag moves indoors and becomes inaccessible to GPS satellite signals.

The normally asleep tag is preprogrammed to periodically wake up and receive satellite position data from the base station and acquire the satellite signals. Pseudo-range data calculated at the tag from the acquired satellite signals are transmitted to the base station. The aforesaid tag wakes up independently whether it is within the coverage zone of the base station and characteristics of the tag displacement. Unassisted search of the satellite signal is an energy-consuming process and reduces tag battery life. Providing an energy-saving protocol of tracking objects is hence a long-felt need.

SUMMARY OF THE INVENTION

It is the object of this invention to disclose an assisted GPS (AGPS) for tracking a movable object of interest. The system comprises at least one GPS-based smart tag releasably affixed to the movable object. The smart tag is interconnected to ground base stations and satellites by means of one or more communication links. The system further comprises a plurality of ground base stations and satellites which emit retrievable scheduled signals, a plurality of beacons adapted to transmit signals carrying individual ID data of the beacons, and, a service center adapted to provide the smart tag with an assisted data and calculating a location of the smart tag. The service center is adapted to communicate with the tag and obtaining a set of pseudo-ranges, calculated by a predetermined protocol of triangulation of the time delays of the signals received from the satellites.

In one embodiment of the invention, the service center of the system defined above is further adapted to receive a beacon ID data, determining an approximate tag location according to both (i) the received beacon ID and (ii) signal measurement data, and generating and transmitting assisted data related to the determined tag approximate location.

In another embodiment of the invention, the service center is adapted to inquire the tag and receiving a response from the tag constituting the pseudo-ranges according to a predetermined protocol.

In another embodiment of the invention, the smart tag comprises (a) a GPS receiver adapted to receive signals broadcasted by a plurality of GPS satellites and calculating a plurality of pseudo-ranges from the tag to the satellites by processing the signals; and, (b) an RF transceiver adapted to (i) measure a signal transmitted by the beacon; (ii) extract the beacon ID data from the signal; (iii) receive the assisted data, (iv) transmit said calculated pseudo-ranges; and (v) retransmit the beacon ID and signal measurement data.

In another embodiment of the invention, the RF transceiver comprises circuits adapted to measure beacon signal parameters selected from the group consisting of a received signal strength indicator and a phase delay, or a combination thereof.

In another embodiment of the invention, the ground base station comprises (a) an RF-transceiver adapted to retransmit the assisted data to the smart tag and receiving the calculated pseudo-ranges, beacon ID and signal measurement data from the smart tag; and an Ethernet interface adapted to retransmit the pseudo-ranges, the beacon ID and signal measurement data to the service center.

In another embodiment of the invention, the communication link between the tag and the ground base station is wireless.

In another embodiment of the invention, the system comprises smart tags selected from the group consisting of optical radiation tags, RF triangulation tags, gate crossing detection tags, or any combination thereof.

In another embodiment of the invention, the smart tag further comprises at least one element selected from a group consisting of microcontroller unit, a motion sensor, and a plurality of I/O lines.

In another embodiment of the invention, a method for tracking a location of a smart tag comprises the steps of: measuring a signal of a nearest beacon device and deriving an ID and signal measurements data from said signal; transferring said ID and signal measurement data to said service center; determining an approximate location of said tag; calculating assisted data according to the approximate tag location; transmitting assisted data according to tag approximate location; searching satellite-broadcasted signal according to said assisted data; receiving satellite-broadcasted signals; calculating pseudo-ranges from said smart tag to said satellites; transferring said pseudo-ranges from said smart tag via a ground base station to a service center; and calculating a tag location.

In another embodiment of the invention, the method further comprises the steps of (i) waking up said smart tag in a cold standby condition prior to receiving ID and signal measurement data of a nearest beacon device; and (ii), restoring said smart tag to a cold standby condition after transferring said pseudo-ranges from said smart tag via a ground base station to a service center.

In another embodiment of the invention, the step of calculating the location of the tag is performed by triangulating the pseudo-ranges.

In another embodiment of the invention, the step of downloading assisted data comprises downloading almanac, ephemeris, transmission frequency, and encoding data.

In another embodiment of the invention, the step of determining an approximate location of the tag is performed according to the beacon location.

In another embodiment of the invention, the step of determining an approximate location of the tag is performed by triangulating the smart tag position using beacon signal measurement data.

In another embodiment of the invention, the step of measuring the beacon signal comprises measuring a received signal strength indicator and a phase delay or any combination thereof.

BRIEF DESCRIPTION OF THE FIGURES

The object and the advantages of various embodiments of the invention will become apparent from the following description when read in conjunction with the accompanying drawings, wherein.

DETAILED DESCRIPTION OF THE EMBODIMENTS

Figure 1:
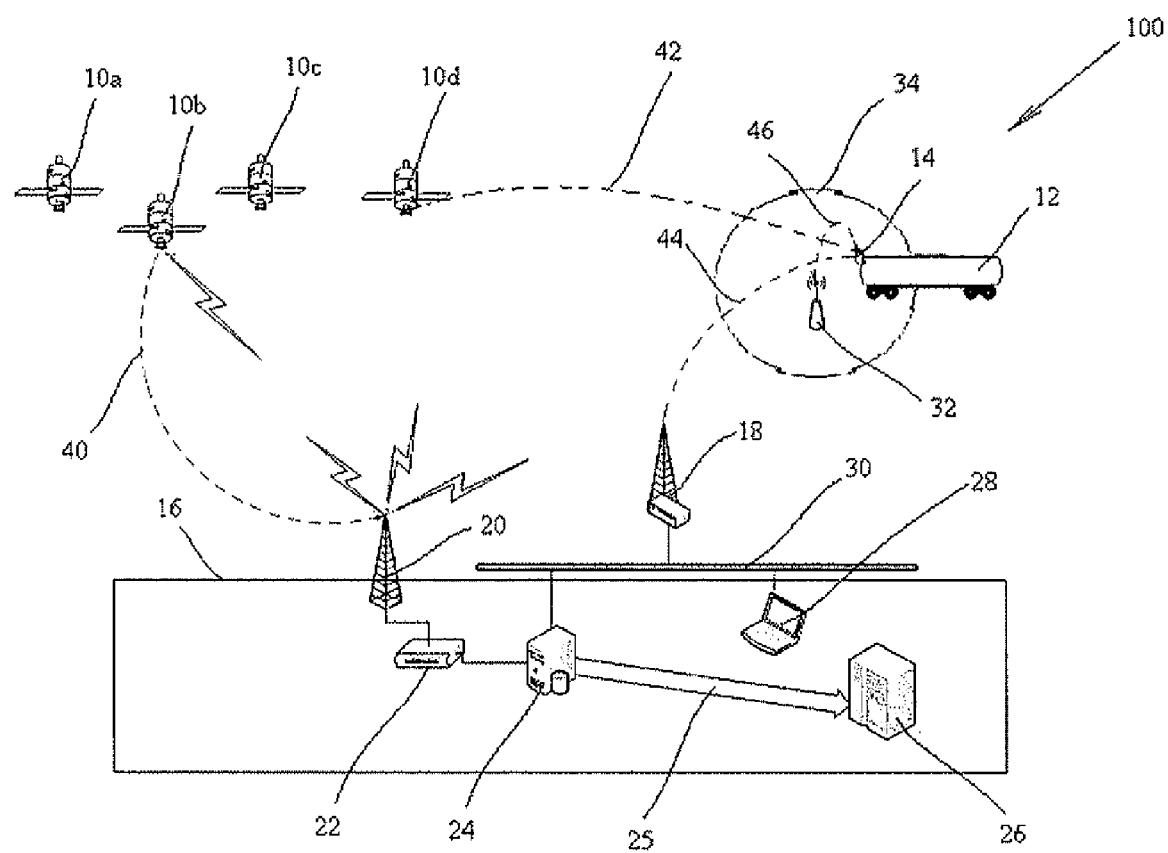
FIG. 1 is a schematic diagram of an AGPS tracking system according to an embodiment of the invention.

The following description is provided alongside all chapters of the present invention, so as to enable any person skilled in the art to make use of said invention and sets forth the best modes contemplated by the inventor of carrying out this invention. Various modifications however, will remain apparent to those skilled in the art, since the generic principles of the present invention have been defined specifically to provide a wireless communication system for tracking assets and methods thereof.

In accordance with the current invention, the preferred technical solution constitutes precisely tracking a plurality of GPS smart tags affixed to the movable objects of interest. The GPS smart tags are wirelessly linked to a service center via a plurality of ground stations covering a tracking area. Additionally, a plurality of beacon devices is disposed in the aforesaid tracking area. The beacon devices are adapted to RF transmit their ID data to the smart tags situated within the beacon service area. Each smart tag situated in the coverage zone of the base station is initialized under command of a service center. One method for determining the location of the smart tag comprises the following steps: (i) determining an approximate location of the smart tag by identifying the nearest beacon device or by triangulating the smart tag position using beacon signal measurements and (ii) determining a precise location of the smart tag by means of an Assisted GPS (AGPS) technology.

The system, which is known as Assisted GPS or AGPS, uses a wireless network to provide the GPS receiver with data, thereby assisting it to acquire the satellite's signal. In a preferred embodiment of the invention, the system provides Ephemeris data to the GPS receiver, which improves the time-to-first-fix (TTFF). The data provided to the GPS receiver can be either the Ephemeris data for visible satellites or, more helpfully the code phase and Doppler ranges over which the GPS device has to search, i.e. 'acquisition assistance'. This technique improves the TTFF by many orders of magnitude, thus minimizing energy consumption. AGPS is also used to improve the sensitivity of the GPS device, thus improving the performance within buildings. By providing so called 'sensitivity assistance' (based roughly on the estimated position of the GPS receiver) to the GPS device, it is able to better correlate the signal being received from the satellite when the signal is low in strength.

Being provided with assisted data, the smart tag receives satellite-broadcasted signals and calculates pseudo-ranges from the tag to the satellites. After transferring data, the smart tag is restored to a cold standby condition. The calculated pseudo-range data is transferred to the service center adapted to determine a smart tag location.

The term 'Assisted GPS' (AGPS) relates to a configuration consisting of a GPS server and plurality of simple mobile GPS receivers connected via a communication link. The mobile GPS receivers are assisted by the GPS server providing data and processing power for position measurement.

The term 'GPS smart tag' relates to tags consisting of a GPS receiver, limited processing power and an interface to a dedicated wireless communication link.

The term 'Almanac' relates to coarse time information and status information about the satellites included in the primary navigation signal broadcasted by a satellite.

The term 'Ephemeris' relates to information that allows the receiver to calculate the position of the satellite.

The term 'Assisted data' relates to data generated by the service center and provided to the GPS smart tag for shortening Time To First Fix ("Acquisition Assistance") and increasing sensitivity ("Sensitivity Assistance"). The aforesaid data comprises at least one element selected from the group consisting of almanac, ephemeris, code phase, and Doppler ranges characterizing the satellite-broadcasted signal.

The term 'Pseudo-range' relates to the range of each of the satellites used by a GPS receiver and is calculated by the time delay of signals received from each satellite. The pseudo-range values are further used to calculate the GPS receiver position by triangulation.

The term 'pseudo random' relates to numbers that are generated digitally and approximate the properties of random numbers.

The term 'Radio frequency (RF) beacon' relates to a radio transmitter transmitting identification data within an area of the transmitter antenna.

The term 'Central processing server' relates to a central processing platform recording location data obtained from all the system smart tags in the database.

The term 'Application server' relates to a user interface platform.

The term 'Application interface' (API) relates to user interface software running on the central processing server and the application server.

The term 'System console' relates to a terminal usable for operating the system.

The term 'IP' is the acronym of internet protocol.

The term 'MCU' is an acronym for a microcontroller unit.

The term 'Receive Signal Strength Indicator' refers to a circuit to measure the strength of an incoming signal. The basic circuit is designed to pick an RF signal and to generate an output equivalent to the signal strength.

Reference is now made to FIG. 1, schematically illustrating a block diagram of an AGPS smart tag system 100 according to an exemplary embodiment of the invention. As seen in FIG. 1, the system 100 comprises a service center 16, a ground base station 18, a beacon 32, and a smart tag 14 adapted to releasably affix to an object of interest 12. The ground base station 18 is connected to the service center 16 via IP network 30. The service center 16 further comprises a central processing server 24, a customer application server 26 connected to the central processing server 24 via a application programming interface 25, and stationary GPS receiver 22 furnished with an antenna 20. The receiver 22 and the smart tag 14 are adapted for to receive signals broadcasted by satellites 10a ... 10d via wireless communication channels 40 and 42, respectively. The ground base station 18 is adapted to wirelessly RF-communicate with the smart tag 14 via a channel 44. The stationary GPS receiver 22 furnished with the antenna 20 is adapted for search and receive signals broadcasted by the satellites available for receiving. As seen in FIG. 1, the beacon device 32 has a service zone 34.

In accordance with the current invention, the smart tag 14 affixed to an object of interest 12 is situated in the service zone 34 of the beacon device 32. The smart tag 14 is woken up by either itself when sensing predefined events (such as motion or time elapsed) or a command sent from the service center 16. Being woken up, for example, by the service center 16, the smart tag 14 receives a signal from the beacon device 32 via wireless communication channel 46. The aforesaid signal carries ID data of this specific beacon 32. The smart tag 14 measures parameters of the beacon signal and derives the beacon ID data. Further the beacon 32 retransmits the received beacon ID and signal measurement data to the service center 16. The beacon ID data enables the service center 16 to determine an approximate location of the smart tag 14 and provide the smart tag 14 with assisted data. The aforesaid data is generated according to satellite-broadcasted signals receivable by the stationary reference GPS receiver 22.

As said above, providing the smart tag 14 with assisted data enables the system 100 to reduce energy consumption due to shortening TTFF (acquisition assistance) and more reliable reception (sensitivity assistance) that is very important in indoor conditions.

The smart tag 14 performs signal search according to the received assisted data, receives satellite-broadcasted signals and calculates pseudo-ranges from the tag 14 to the available satellites 10a, 10b, 10c, and 10d. The calculated pseudo-ranges are transmitted to the service center 16 for further processing. The central processing server 24 is adapted to calculate a location of the smart tag 14 by means of triangulating the obtained pseudo-ranges.

Reduced power consumption comes about because the smart tag 14 is in standby condition and is woken up for a short time on demand.

Figure 2:
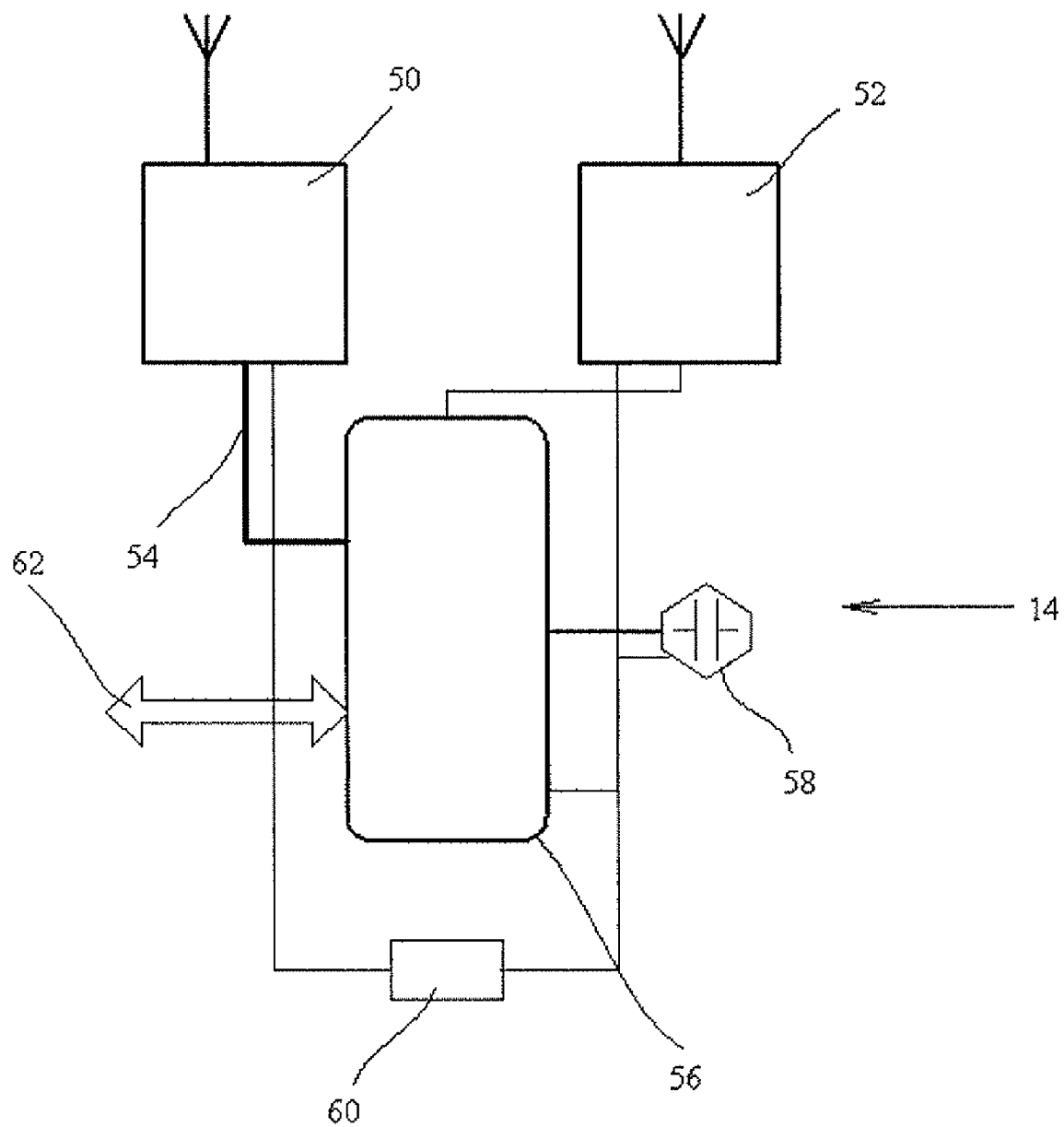
FIG. 2 is a block diagram of the smart tag shown in FIG. 1.

Reference is now is made to FIG. 2, presenting a block diagram of the AGPS smart tag 14. The aforesaid smart tag comprises an AGPS receiver 50, an RF-transceiver 52, a data bus 54, a microcontroller unit 56, a motion sensor 58, a battery 60, and I/O port 62.

As said above, the AGPS smart tag 14 is in standby condition by default. The tag is woken up by either itself when sensing predefined events (such as motion or time elapsed) or a command sent from the service center 16 via the wireless RF-communication channel 44. The transceiver 52 receives a signal from the beacon device 32 via wireless communication channel 46. The aforesaid signal carries ID data of the specific beacon 32. The microcontroller 56 measures signal parameters and derives the beacon ID data. Optionally, a received signal strength indicator and a phase delay or any combination thereof are measured by microcontroller 56.

Further, the transceiver 52 retransmits the received beacon ID and signal measurement data to the service center 16. The beacon ID data enables the service center 16 (not shown) to determine an approximate location of the smart tag 14, generate the assisted data, and provide the smart tag 14 with the approximate location and the assisted data.

Being provided with assisted data, the AGPS receiver 50 searches and receives the satellite-broadcasted signals. The pseudo-random waveform received by GPS receiver 50 is compared with an internally generated version of the same code with delay control, until both waveforms are synchronized. The obtained delay of internal pseudo-random form corresponding to the waveform synchronization defines the travel time of the GPS signal from the satellite to the receiver 50. The obtained delay values are provided via the data bus 54 to the microcontroller unit 56. The delay values (pseudo-ranges) further are transferred to the service center 16 via an RF-communication link 44 for calculating the smart tag location. Thereafter, the smart tag 14 restores to the standby condition.

The smart tag 14 is a mobile battery-powered device. Therefore, it is important that the suggested mode of short-time sessions of pseudo-range measurements secures a long battery service life. The smart tag 14 further comprises a motion sensor 58 enabling the service center to assist tracking the smart tag 14 outside the service area. I/O port 62 provides a connection of peripheral devices (not shown) to the smart tag 14 and two-way data interchange between the aforesaid device and the service center 16.

Figure 3:
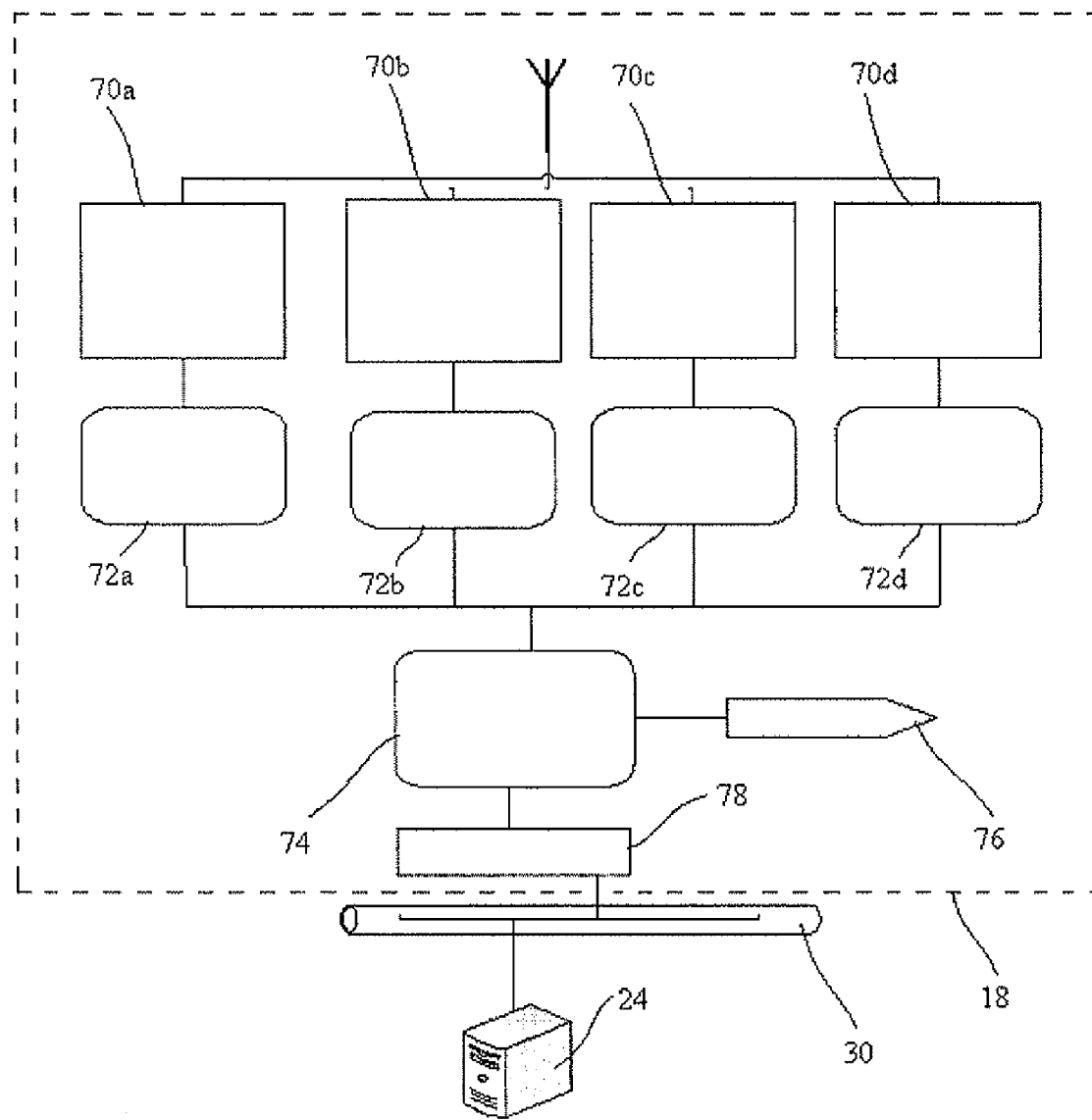
FIG. 3 is a block diagram of the ground base station shown in FIG. 1.

Reference is now made to FIG. 3, schematically illustrating a block diagram of the architecture of the ground base station 18. The aforesaid base station 18 is a ground communication unit communicating with the plurality of mobile smart tags via wireless communication links.

The base station 18 comprises four independent RF transceiver modules 70a, 70b, 70c, and 70d (rack transceiver) operating simultaneously. The rack transceiver is required for supporting the frequency diversity mode of operation, providing the required capabilities for withstanding external interferences. Microcontroller units 72a, 72b, 72c, and 72d perform management of the data stream in transceivers 70a, 70b, 70c, and 70d, respectively.

Figure 4:
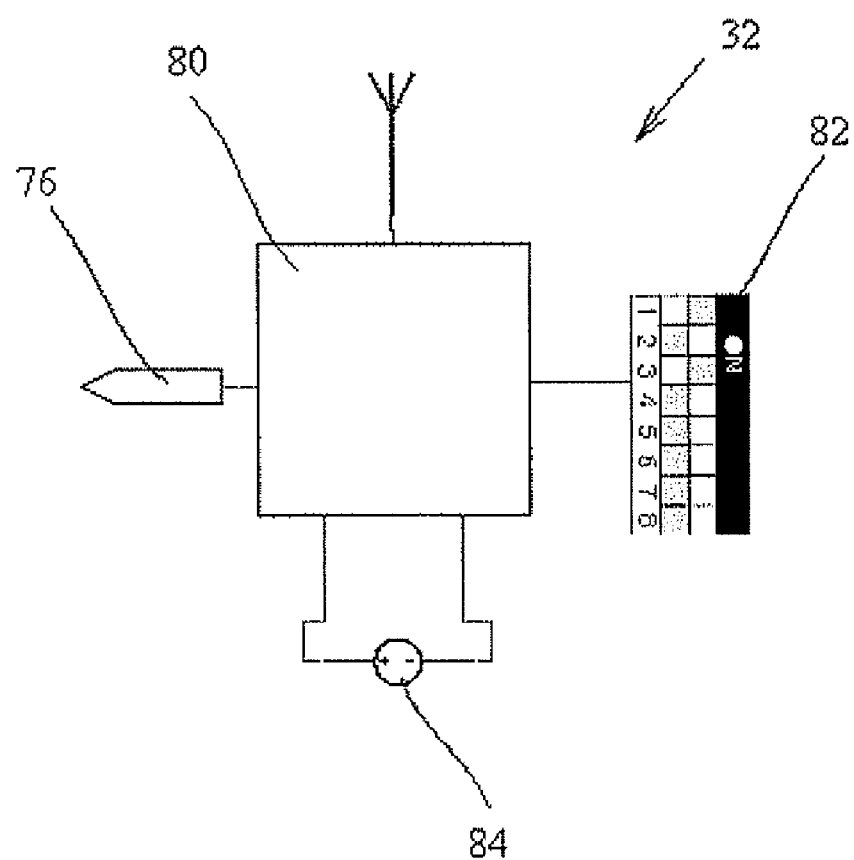
FIG. 4 is a block diagram of the beacon device shown in FIG. 1.

A central microcontroller unit 74 is responsible for activating and controlling internal operational logic of the base station 18. A serial port 76 connects peripheral devices to the base station 18. As seen in FIG. 4, the base station 18 further comprises Ethernet chipset 78 for connecting to the Ethernet 30. The base station 18 is controlled by central processing server 24 via the Ethernet connection 30.

Reference is now made to FIG. 4, presenting a block diagram of the AC/DC (84)-powered beacon device 32 comprising an RF-transceiver 80 capable of transmitting beacon device ID data at the predetermined frequency and time. The beacon device 32 is furnished with an attenuator 82 and the serial or USB port 76 enabling the service center to change over the air a level of emitted power and configuring and maintaining the beacon device 32, respectively.

Figure 5:
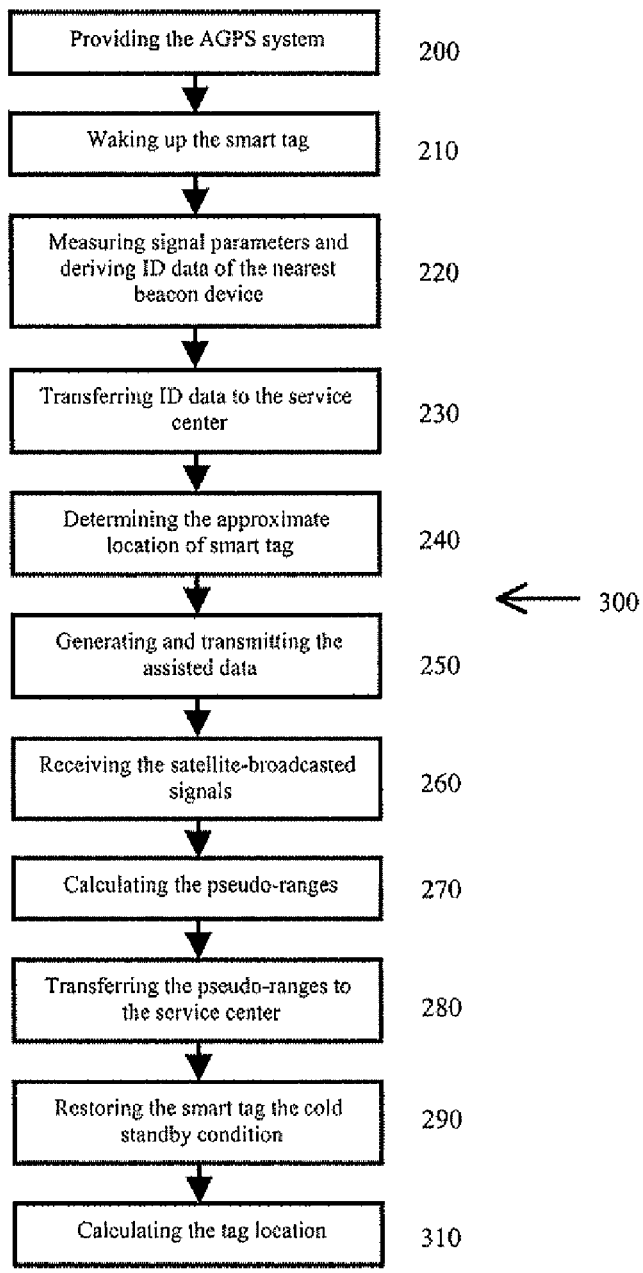
FIG. 5 is a flow chart of a method for using the AGPS tracking system according to an embodiment of the invention.

Reference is now made to FIG. 5, showing a flowchart of a method 300 for using a preferred embodiment of an AGPS system for tracking an object of interest, according to the invention. In step 200, an AGPS system is provided having a smart tag. The smart tag is woken up at step 210. The aforesaid smart tag measures RF-signals of the nearest beacon devices in-view and derives signal ID data of the nearest beacon device at step 220. The smart tag then retransmits signal measurement and ID data to the service center (step 230). The service center determines an approximate location of the smart tag (step 240) and generates and transmits the assisted data (step 250). As stated above, the assisted data provides both acquisition and sensitivity assistance. Stated another way, using the assisted data shortens TTFF and increases reliability of the objects location in indoor conditions.

The smart tag receives the satellite-broadcasted signals at the further step 260 according the assisted data.

Calculating the pseudo-ranges at step 270 is based on the obtained satellite signals. The calculated pseudo-ranges are transferred to the service center at the step 280. Restoring the smart tag to the cold standby condition at the step 290 secures reduced power consumption and enhances battery life. Calculating the tag location at the step 310 ends the flowchart 300. The obtained result provides coordinates characterizing the smart tag location.

Thus, in accordance with the current invention, the reduction of power consumption is attained due to initializing the smart tag by the service center during determining the smart tag location and restoring the aforesaid tag to the cold standby condition after transmitting the pseudo-ranges.

The preliminary determination of the approximate tag location using the beacon devices enables the service center to provide improved GPS assistance by means of transmitting more precise satellite data to the smart tag.

What is claimed is:

1. An assisted global positioning system (AGPS) for tracking a movable object of interest; said system comprising:
    at least one GPS-based smart tag releasably affixed to said movable object, said smart tag interconnected to a ground base station and a plurality of GPS satellites by means of one or more communication links, wherein the ground base station and the plurality of GPS satellites emit retrievable scheduled signals, and said smart tag is configured to:
    (1) remain in a cold standby condition prior to receiving an ID signal of a nearest one of a plurality of beacons, each beacon adapted to transmit a respective ID signal identifying said beacon,
    (2) wake up upon receiving the ID signal from the nearest beacon,
    (3) calculate a set of pseudo ranges and transmit the set of pseudo-ranges from said smart tag via the ground base station to a service center, the service center adapted to provide said smart tag with an assisted data, and
    (4) be restored to a cold standby condition after transmitting the set of pseudo-ranges;
    wherein said service center is adapted to communicate with said tag and receiving the set of pseudo-ranges, and calculating a location of the tag by triangulation of the time delays of said signals received from said satellites.

2. The system according to claim 1, wherein said service center is further adapted to:
    a. receive a beacon ID data;
    b. determine an approximate tag location according to both (i) said received beacon ID and (ii) signal measurement data; and
    c. generate and transmit the assisted data related with the determined tag approximate location.

3. The system according to claim 2, wherein said assisted data comprises at least one element selected from the group consisting of almanac, ephemeris, transmission frequency, and encoding data.

4. The system according to claim 1, wherein said smart tag comprises:
    a. a GPS receiver adapted to receive signals broadcasted by the plurality of GPS satellites and calculating a plurality of pseudo-ranges from said tag to said satellites by processing said signals; and,
    b. an RF transceiver adapted to:
        (i) wake up when beacon transmission has been sensed;
        (ii) measure a signal transmitted by said beacon;
        (iii) extract said beacon ID data from said signal;
        (iv) receive said assisted data,
        (v) transmit said calculated pseudo-ranges; and
        (vi) retransmit said beacon ID and signal measurement data.

5. The system according to claim 4, wherein said RF transceiver comprises circuits adapted to identify the beacon and measure beacon signal parameters selected from the group consisting of a received signal strength indicator and a phase delay, or any combination thereof.

6. The system according to claim 1, wherein each said ground base station comprises:
    a. an RF-transceiver adapted to retransmit said assisted data to said smart tag and receiving said calculated pseudo-ranges, beacon ID and signal measurement data from said smart tag; and
    b. an Ethernet interface adapted to retransmit said pseudo-ranges, said ID and signal measurement data to the service center.

7. The system according to claim 1, wherein said communication link between said tag and said ground base station is wireless.

8. The system according to claim 1, wherein said system comprises smart tags selected from the group consisting of optical radiation tags, RF triangulation tags, gate crossing detection tags, and any combination thereof.

9. The system according to claim 1, wherein said smart tag further comprises at least one element selected from the group consisting of microcontroller unit, a motion sensor, and a plurality of I/O lines.

10. A method for tracking a location of a smart tag, said method comprising the steps of:
    (a) providing the system according to claim 1;
    (b) measuring a signal of a nearest beacon device and deriving an ID and signal measurements data from said signal;
    (c) transferring said ID and signal measurement data to said service center;
    (d) determining an approximate location of said tag;
    (e) calculating assisted data according to the approximate tag location;
    (f) transmitting assisted data according to tag approximate location;
    (g) searching satellite-broadcasted signal according to said assisted data;
    (h) receiving satellite-broadcasted signals,
    (i) calculating pseudo-ranges from said smart tag to said satellites;

transferring said pseudo-ranges from said smart tag via a ground base station to the service center.

11. The method according to claim 10 wherein said method further comprises the steps of (i) waking up said smart tag in a cold standby condition, prior to receiving ID and signal measurement data of a nearest beacon device; and (ii), restoring said smart tag to a cold standby condition after transferring said pseudo-ranges from said smart tag via a ground base station to a service center.

12. The method according to claim 10, wherein said step of calculating said location of said tag is performed by triangulating the said pseudo-ranges.

13. The method according to claim 10, wherein said step of downloading assisted data comprises downloading almanac, empheris, transmission frequency, and encoding data.

14. The method according to claim 10, wherein said step of determining an approximate location of the tag is performed according to the beacon location.

15. The method according to claim 10, wherein said step of determining an approximate location of said tag is performed by triangulating the smart tag position using beacon signal measurement data.

16. The method according to claim 10, wherein said step of measuring said beacon signal comprises measuring signal parameters selected from the group consisting of a received signal strength indicator and a phase delay.

17. An assisted global positioning system (AGPS) for tracking a movable object of interest; said system comprising:
  a. a plurality of beacons, each adapted to transmit a respective ID signal identifying said beacon;
  b. at least one ground base station that emits retrievable scheduled signals; and
  c. at least one GPS-based smart tag releasably affixed to said movable object, said smart tag interconnected to the ground base station and a plurality of GPS satellites by means of one or more communication links, wherein the plurality of GPS satellites emit retrievable scheduled signals, and said smart tag is configured to:
    (1) remain in a cold standby condition prior to receiving the ID signal of a nearest one of said beacons,
    (2) wake up upon receiving the ID signal from the nearest beacon,
    (3) calculate a set of pseudo ranges and transmit the set of pseudo-ranges from said smart tag via the ground base station to a service center, the service center adapted to provide said smart tag with an assisted data, and
    (4) be restored to a cold standby condition after transmitting the set of pseudo-ranges;
  wherein said service center is adapted to communicate with said tag and receiving the set of pseudo-ranges, and calculating a location of the tag by triangulation of the time delays of said signals received from said satellites.

18. An assisted global positioning system (AGPS) for tracking a movable object of interest; said system comprising:
  a. a plurality of beacons, each adapted to transmit a respective ID signal identifying said beacon;
  b. at least one ground base station that emits retrievable scheduled signals; and
  c. at least one GPS-based smart tag releasably affixed to said movable object, said smart tag interconnected to the ground base station and a plurality of GPS satellites by means of one or more communication links, wherein the plurality of GPS satellites emit retrievable scheduled signals, and said smart tag is configured to:
    (1) remain in a cold standby condition prior to receiving the ID signal of a nearest one of said beacons,
    (2) wake up upon receiving the ID signal from the nearest beacon,
    (3) calculate a set of pseudo ranges and transmit the set of pseudo-ranges from said smart tag via the ground base station, and
    (4) be restored to a cold standby condition after transmitting the set of pseudo-ranges; and
  d. a service center configured to receive the pseudo ranges calculated by the tag via the ground base station, the service center adapted to provide said smart tag with an assisted data wherein said service center is adapted to communicate with said tag and receiving the set of pseudo-ranges, and calculating a location of the tag by triangulation of the time delays of said signals received from said satellites.

* * * * *